United States Patent [19]

Alvarenga

[11] Patent Number: 5,281,118
[45] Date of Patent: Jan. 25, 1994

[54] GROOVED ENVELOPE FOR RECAPPING OR RETREADING TIRES

[75] Inventor: Marconi G. Alvarenga, Belo Horizonte, Brazil

[73] Assignee: Uniao Industrial de Borrachs S/A UNISA, Cidade Industrial Contagem-MG, Brazil

[21] Appl. No.: 825,019

[22] Filed: Jan. 24, 1992

[30] Foreign Application Priority Data

Oct. 4, 1991 [BR] Brazil .................................. 7100655

[51] Int. Cl.$^5$ .............................................. B29C 35/00
[52] U.S. Cl. .................................... 425/32; 156/394.1; 156/909; 425/48
[58] Field of Search .............. 156/96, 394.1, 909; 425/14, 28.1, 32, 48; 264/313

[56] References Cited

U.S. PATENT DOCUMENTS

| 4,500,375 | 2/1985 | Goldstein | 425/28.1 X |
| 4,808,256 | 2/1989 | Hill | 156/394.1 |
| 4,878,822 | 11/1989 | Wetch | 425/14 |

*Primary Examiner*—Charles Hart
*Attorney, Agent, or Firm*—Darby & Darby

[57] ABSTRACT

A vulcanized rubber device to envelop a tire being recapped or retreaded, when place in an autoclave to vulcanize the rubber strip cemented between the new tread and the treated tire. This device, has an annular form, with a "U" section, whose lateral surfaces (5), are provided with a hole (2) and (4), and surrounding a circular opening (3), but has a new feature; a ring with grooves (1), on the inside of each internal lateral surface (4) and (5), forming radiating furrows.

2 Claims, 1 Drawing Sheet

GROOVED ENVELOPE FOR RECAPPING OR RETREADING TIRES

BACKGROUND OF THE INVENTION

A tire recap tread a vulcanized rubber device having inside grooves that is designed to envelop tires when they are introduced in an autoclave for vulcanizing the bead in recapping or retreading by the premolded or precured method is known.

In recapping or retreading by the premolded or cold processes, the tire has the old layer of rubber that remains in its tread scraped in the proper machine for this purpose. Following this, a given amount of a rubber base glue is applied on the scraped surface, which is left to dry. A new tread consisting of premolded vulcanized rubber with the characteristic groove design stamped on the upper surface, has a connecting film made of crude rubber glued to the under surface, and the combination is fitted to the previously scraped tire surface. This fitting is done on a machine for this purpose, that rolls the design on the band applied as the tire rotates, from the center to the sides. Afterwards, to finish it, a strip of rubber is glued along each joint of the premolded tread, and side band of the tire. After being prepared in this manner, it is placed in a special autoclave housing, used in the tire renewal industry, for the purpose of keeping the compressed air in the autoclave from entering during the process of vulcanizing the bead, located between the new tread applied and the tire being reconstructed or renovated.

BRIEF SUMMARY OF THE INVENTION

An envelope for recapping tires is provided of annular form which has a U-shape into which the tire to be recapped is inserted and compressed air is supplied. A plurality of grooves is provided on and around each of the inside walls of the envelope to enhance the passage of air between the envelope wall and the tire wall.

DETAILED DESCRIPTION OF THE INVENTION

Figure 1:
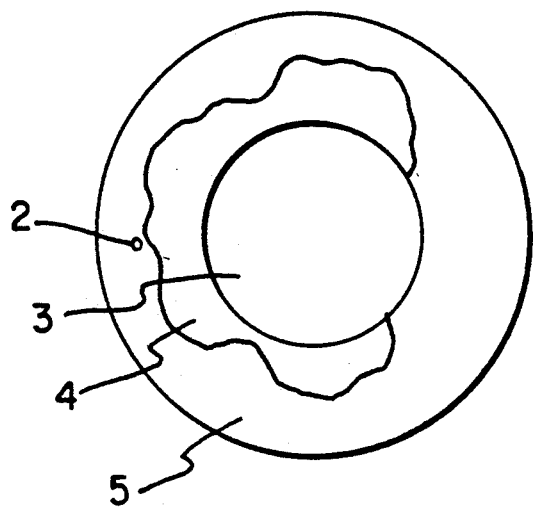
FIG. 1 shows an overall elevation view of a prior art envelope.

In FIGS. 1 (prior art) and 2 (the invention) respectively, the parts are numbered as:

5—an envelop into which the tire to be recapped is placed

Figure 2:
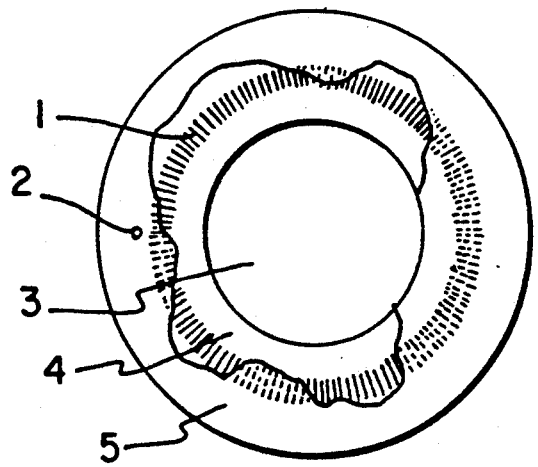
FIG. 2 is a view similar to FIG. 1 partly broken away to show the inside of the envelope.

1—a plurality of grooves laid out in ring shape on each internal wall of the envelope (FIG. 2)

2—a hole in one of the envelope walls through which air is admitted

3—a circular opening of the envelope

4—the inner surface of the rear wall of the envelope

6

The conventional envelope of FIG. 1 is made of vulcanized rubber in an annular form, having a "U" section with the open part toward the center of the ring, which may either be a single piece or have a joint in its larger circumference. This open part forms a circular opening (3), and is equal to the diameter of the rim on which the tire is going to be used, or on a device for fixing the tire by means of an expanding rim with a flange or by assemblying it on a wheel with a flange. The hole (2), is where an air valve is fitted at a height equal to the tire band or shoulder and the edges of the opening (3), reinforced to increase its resistance to tear when opened by stretching, to introduce the tire prepared for recapping or retreading. The edges of the opening (3) are attached to the bead or side of the tire by a flange properly connected or a wheel with a flange. Another device, called an "internal envelope" can also be used in this work.

This envelope assembly s placed inside an autoclave having a hose leading outside. The inside end of the hose is connected to the valve fitted in the hole (2). When the autoclave is pressurized, the air that is between the envelope and the tire is exhausted through the hose, while the air contained in the autoclave does not penetrate in the envelope, due to the seal made by the rim flange and hose, in addition to the envelope itself.

Nevertheless, due to the fact that the internal surfaces are completely smooth, the conventional envelope does not always avoid a certain type of damage to the tire being recapped or retreaded. This is because, when the faces of internal surfaces (4) are pressed against the edges of the new tread and the side of the tire, air bubbles are trapped, that, when compressed, dislodge the crude rubber film which, after being vulcanized remain in the wrong position, producing hollows that are both technically and aesthetically unfit for use.

The difference between the conventional envelope and the present invention as shown in FIG. 2 shown in FIG. 2 in which there is a grooved rings (1) stamped on the face of each of the envelope internal surfaces (4) in a position corresponding to the edges of the tire tread, it is so being that such grooves form radiating furrows. Therefore, when the grooved envelope is pressed in the autoclave, all of the air contained therein exhausts through the furrows formed between the grooves of the rings (1), avoiding the crude rubber film being dislodges, con consequently damaging the final product.

The advantages of the invention over the corresponding conventional envelopes are: technical, in avoiding that the recapped or retreaded tire be damaged, and aesthetical, by stamping grooves on the edges between the new treads and the side of the tire, so that it looks like the design on many new tires.

I claim:

1. An envelope for recapping tires comprising:
    an annular jacket of flexible material for accepting a tire, said envelope having a generally U-shaped cross-section with opposing lateral walls to oppose the tire side walls and a circular central opening,
    means on the exterior of a lateral wall to admit air into said envelope, and
    a plurality of grooves on the internal surface of each of said envelope lateral walls to define areas for the passage of air between the said envelope lateral walls and the tire side walls.

2. An envelope as in claim 1 wherein each said ring of grooves is formed by stamping.

* * * * *